(12) United States Patent
Fewkes et al.

(10) Patent No.: US 9,534,766 B2
(45) Date of Patent: Jan. 3, 2017

(54) LIGHTING UNITS HAVING LIGHT-DIFFUSING OPTICAL FIBER

(71) Applicant: Corning Incorporated, Corning, NY (US)

(72) Inventors: Edward John Fewkes, Corning, NY (US); Jacques Gollier, Painted Post, NY (US); Joydeep Lahiri, Painted Post, NY (US); Stephan Lvovich Logunov, Corning, NY (US); William James Miller, Horseheads, NY (US); Ying Zhang, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 12 days.

(21) Appl. No.: 14/326,707

(22) Filed: Jul. 9, 2014

(65) Prior Publication Data

US 2016/0010833 A1 Jan. 14, 2016

(51) Int. Cl.
*F21V 17/06* (2006.01)
*G02B 6/36* (2006.01)
*F21V 8/00* (2006.01)
*F21Y 101/00* (2016.01)

(52) U.S. Cl.
CPC .............. *F21V 17/06* (2013.01); *G02B 6/001* (2013.01); *F21Y 2101/00* (2013.01); *F21Y 2115/30* (2016.08); *G02B 6/0006* (2013.01); *G02B 6/3632* (2013.01)

(58) Field of Classification Search
CPC ....... G02B 6/0005; G02B 6/001; G02B 6/006; G02B 6/008
See application file for complete search history.

(56) References Cited

U.S. PATENT DOCUMENTS

| 5,301,090 A | 4/1994 | Hed |
| 5,486,984 A | 1/1996 | Miller |
| 5,542,016 A | 7/1996 | Kaschke |

(Continued)

FOREIGN PATENT DOCUMENTS

| DE | 10206613 | 8/2003 |
| EP | 1970621 | 9/2008 |

(Continued)

OTHER PUBLICATIONS

International Search Report and Written Opinion of the International Searching Authority; PCT/US2014/045713; Mailed Oct. 29, 2014.

(Continued)

*Primary Examiner* — Anne Hines
(74) *Attorney, Agent, or Firm* — Svetlana Z. Short

(57) ABSTRACT

Lighting units and light fixtures incorporating lighting units having light-diffusing optical fiber are disclosed. Lighting units include a light source, at least one light-diffusing optical fiber optically coupled to the light source, and a support plate. The at least one light-diffusing optical fiber scatters light that is optically coupled into the at least one light-diffusing optical fiber from the light source. The support plate has a retention groove to which a portion of the at least one light-diffusing optical fiber is coupled. The support plate also includes a perimeter. A groove length of the retention groove is greater than the perimeter of the support plate.

57 Claims, 15 Drawing Sheets

(56) References Cited

U.S. PATENT DOCUMENTS

| | | | |
|---|---|---|---|
| 5,793,911 A * | 8/1998 | Foley | G02B 6/001 362/562 |
| 6,076,943 A | 6/2000 | Lassovsky | |
| 6,272,265 B1 | 8/2001 | Franklin | |
| 7,540,806 B2 | 6/2009 | Tastad | |
| 7,862,219 B2 | 1/2011 | Mersch et al. | |
| 8,492,448 B2 | 7/2013 | Dewa et al. | |
| 8,591,087 B2 | 11/2013 | Bickham et al. | |
| 8,620,125 B2 | 12/2013 | Button et al. | |
| 8,805,141 B2 | 8/2014 | Fewkes et al. | |
| 8,929,703 B2 | 1/2015 | Logunov et al. | |
| 8,967,845 B2 | 3/2015 | Bennett et al. | |
| 9,025,923 B2 | 5/2015 | Logunov | |
| 2001/0050667 A1 | 12/2001 | Kim et al. | |
| 2006/0250816 A1 | 11/2006 | Gao | |
| 2008/0232114 A1 | 9/2008 | Verhaegh et al. | |
| 2009/0027587 A1 | 1/2009 | Itoh et al. | |
| 2009/0322985 A1 | 12/2009 | Mizuuchi | |
| 2011/0122646 A1 | 5/2011 | Bickham et al. | |
| 2011/0305035 A1 | 12/2011 | Bickham et al. | |
| 2012/0201038 A1 | 8/2012 | Birnstock et al. | |
| 2012/0275178 A1 * | 11/2012 | Logunov | G02B 6/0028 362/552 |
| 2013/0088888 A1 | 4/2013 | Fewkes et al. | |
| 2014/0340865 A1 * | 11/2014 | Hikmet | G02F 1/133533 362/19 |

FOREIGN PATENT DOCUMENTS

| | | |
|---|---|---|
| JP | 2006134720 | 5/2006 |
| WO | 2009/071546 | 6/2009 |

OTHER PUBLICATIONS

Invitation to Pay Additional Fees; PCT/US2014045713 Mailed Sep. 23, 2014.

* cited by examiner

LIGHTING UNITS HAVING LIGHT-DIFFUSING OPTICAL FIBER

CROSS-REFERENCE TO RELATED APPLICATIONS

This application claims the benefit of priority under 35 U.S.C. §119 of U.S. Provisional Application Ser. No. 61/844,992 filed on Jul. 11, 2013 the contents of which are relied upon and incorporated herein by reference in their entirety.

TECHNICAL FIELD

The present specification generally relates to lighting units for light fixtures having light diffusing fiber.

BACKGROUND

Lighting fixtures conventionally incorporate light sources including, for example, incandescent light bulbs, halogen light bulbs, compact fluorescent bulbs, and light emitting diodes (LEDs) that are positioned within the lighting fixture to provide an illumination light source. In some end-user applications for the lighting fixture, the light source may not provide the desired quality of light. For example, for lighting fixtures that incorporate LEDs as light sources, the LEDs have high directionality in the light emitted and may cause glare when viewed without shielding. To reduce the effects of directionality and glare, an increased number of LEDs that operate with lower brightness per LED may be positioned within the light source. Alternatively, or in addition, a light diffusing element may be positioned proximate to the LEDs to diffuse the light emitted, thereby reducing the intensity of individual LEDs. However, these additions may increase the cost of the light source and/or increase mechanical and thermal complexity of the light source.

Accordingly, alternative lighting units may be desired.

SUMMARY

In one embodiment, a lighting unit includes a light source, at least one light-diffusing optical fiber optically coupled to the light source, and a support plate. The at least one light-diffusing optical fiber scatters light that is optically coupled into the at least one light-diffusing optical fiber from the light source. The support plate has a retention groove to which a portion of the at least one light-diffusing optical fiber is coupled. The support plate also includes a perimeter. A groove length of the retention groove is greater than the perimeter of the support plate.

In another embodiment, a lighting unit includes a light source, at least one light-diffusing optical fiber optically coupled to the light source, and a support plate. The at least one light-diffusing optical fiber scatters light that is optically coupled into the at least one light-diffusing optical fiber from the light source. The support plate includes a first surface, a second surface opposite the first surface, and a retention groove debossed into at least the first surface of the support plate. A portion of the at least one light-diffusing optical fiber is positioned in the retention groove such that the light scattered from the at least one light-diffusing optical fiber is optically coupled into the support plate, thereby illuminating the support plate.

In yet another embodiment, a lighting unit includes a light source, at least one light-diffusing optical fiber optically coupled to the light source, and a support plate. The at least one light-diffusing optical fiber scatters light that is optically coupled into the at least one light-diffusing optical fiber from the light source. The support plate has a first surface and a perimeter that circumscribes the first surface. The at least one light-diffusing optical fiber is positioned proximate to the first surface, a length of the light-diffusing optical fiber positioned inside of the perimeter is greater than the perimeter, and the lighting unit is free from a cover plate positioned opposite the at least one light-diffusing optical fiber from the support plate.

In yet another embodiment, a lighting unit includes a cover plate having at least one light shaping element and a perimeter, at least one light-diffusing optical fiber coupled to the cover plate, and a light source optically coupled to the at least one light-diffusing optical fiber. The at least one light-diffusing optical fiber has a length greater than the perimeter of the cover plate and the at least one light-diffusing optical fiber scatters light optically coupled into the at least one light-diffusing optical fiber from the light source.

In yet another embodiment, a lighting unit includes a light source, at least one light-diffusing optical fiber optically coupled to the light source, and a support plate. The at least one light-diffusing optical fiber scatters light optically coupled into the at least one light-diffusing optical fiber from the light source. The support plate has a plurality of retention bosses spaced apart from one another to which a portion of the at least one light-diffusing optical fiber is coupled, the support plate further having a perimeter. A length of the light-diffusing optical fiber positioned inside of the perimeter is greater than the perimeter of the support plate.

In yet another embodiment, a lighting unit includes a light source, a support plate having a perimeter, a cover plate coupled to the support plate, and an optical fiber assembly positioned between the support plate and the cover plate. At least a portion of the optical fiber assembly is coupled to at least one of the support plate and the cover plate. The optical fiber assembly includes at least one light-diffusing optical fiber positioned inside a jacket. The at least one light-diffusing optical fiber is optically coupled to the light source and scatters light that is optically coupled into the at least one light-diffusing optical fiber from the light source into the jacket.

Additional features and advantages of the embodiments described herein will be set forth in the detailed description which follows, and in part will be readily apparent to those skilled in the art from that description or recognized by practicing the embodiments described herein, including the detailed description that follows, the claims, as well as the appended drawings.

It should be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
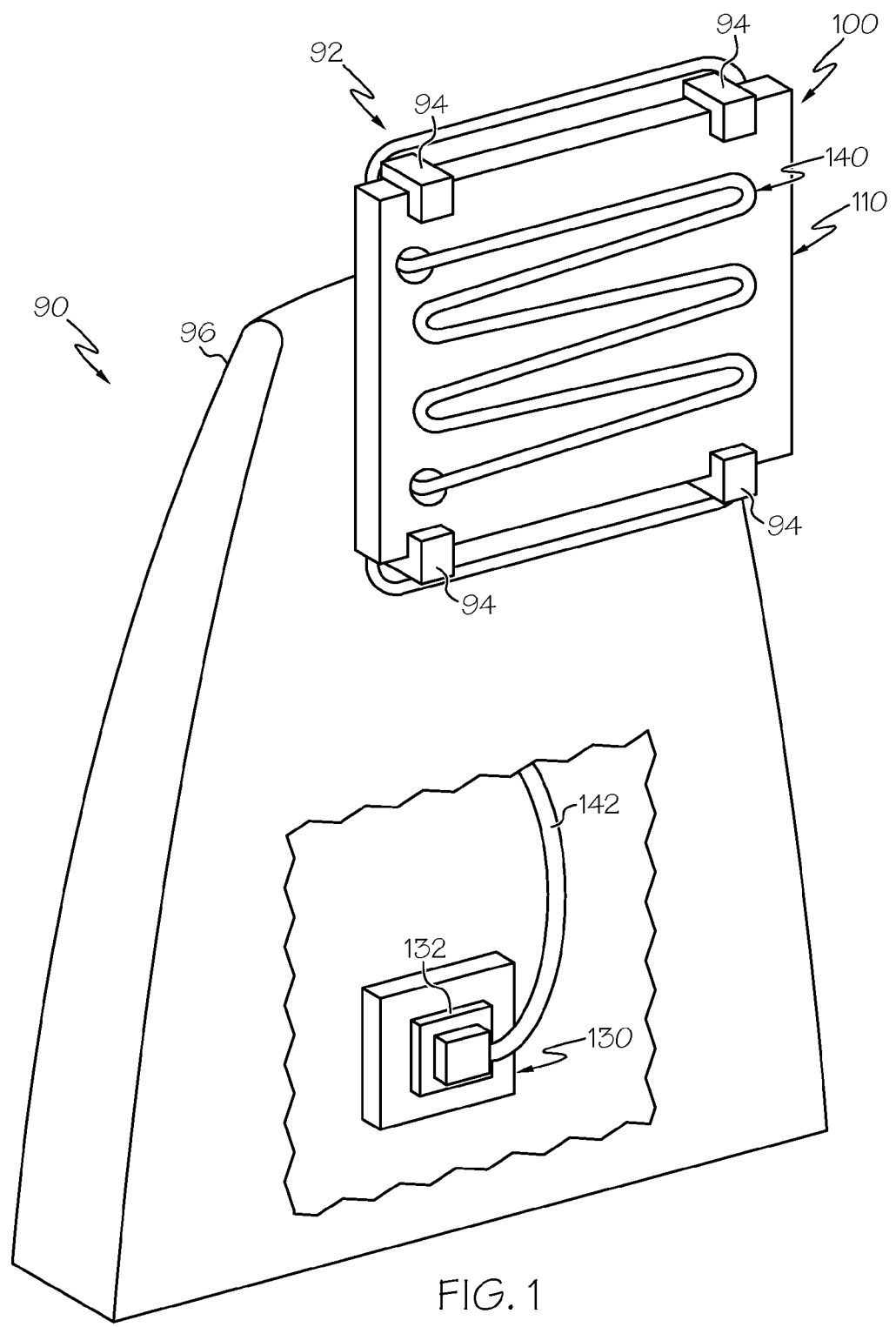
FIG. 1 schematically depicts a side perspective view of a light fixture incorporating a lighting unit having light-diffusing optical fiber according to one or more embodiments shown or described herein.

Reference will now be made in detail to embodiments of lighting units and light fixtures incorporating lighting units having light-diffusing optical fiber that scatters light to the surrounding environment. One embodiment of a lighting unit incorporating a light diffusing fiber is generally depicted in FIG. 1. The lighting unit, also referred to as a luminaire, may be installed into decorative and/or structurally supportive light fixtures, as required by a particular end-user application. The lighting unit includes a light source optically coupled to at least one light-diffusing optical fiber and a support plate. The support plate includes a retention groove to which a portion of the light-diffusing optical fiber is coupled. The groove is positioned along the support plate and includes a groove length that is greater than the perimeter of the support plate. The light source directs light into the light-diffusing optical fiber, which scatters the light in a lighting pattern. Certain embodiments of the lighting unit may include cover plates positioned opposite the light-diffusing optical fiber from the support plate. The cover plates may modify the light emitted by the light-diffusing optical fiber. The retention groove of the support plate may have a variety of configurations to support the light-diffusing optical fiber to produce the desired light pattern. These and other embodiments will be described in more detail with reference to the appended figures.

Referring to FIG. 1 in detail, a light fixture 90 incorporating a lighting unit 100 according to the present disclosure is depicted. The lighting unit 100 includes a support plate 110, a light-diffusing optical fiber 140, and a light source 130 optically coupled to the light-diffusing optical fiber 140. In the embodiment depicted in FIG. 1, the support plate 110 is coupled to a riser portion 96 of the light fixture 90. In the depicted embodiment, the support plate 110 is coupled to an adjustment plate 92 with a plurality of clips 94. The adjustment plate 92 and the riser portion 96 allow for reorientation of the support plate 110 of the lighting unit 100. While one configuration of the light fixture 90 is depicted in FIG. 1, it should be understood that a variety of configurations of light fixture 90 may incorporate the lighting unit 100.

The light source 130 of the lighting unit 100 may include a variety of commercially available light sources, including LEDs and laser diodes 132. The light source 130 may emit light at a variety of wavelengths, including at wavelengths within the visible spectrum, from about 390 nm to about 700 nm. Light emitted by the light source 130 may be transmitted to the light-diffusing optical fiber 140, from which the light is scattered into the surrounding environment. As will be discussed in greater detail below, the light-diffusing optical fiber 140 of the embodiment depicted in FIG. 1 is coupled to the light source 130 by a transmission optical fiber 142.

Embodiments of light fixtures that incorporate light-diffusing optical fiber 140 according to the present disclosure may be powered by a variety of power sources, including mains power, battery power, and the like. In certain embodiments, the light fixture 90 (see FIG. 1) incorporating the lighting unit 100 may be free from electric coupling with mains power, such as where the light fixture includes a self-contained power source (i.e., a battery).

As discussed hereinabove, the lighting unit 100 includes at least one light-diffusing optical fiber 140. The term "light-diffusing" means that light scattering is substantially spatially continuous along at least a portion of the length of the light-diffusing optical fiber 140, i.e., there are no substantial jumps or discontinuities such as those associated with discrete (e.g., point) scattering. Thus, the concept of substantially continuous light emission or substantially continuous light scattering as set forth in the present disclosure refers to spatial continuity.

Figure 2:
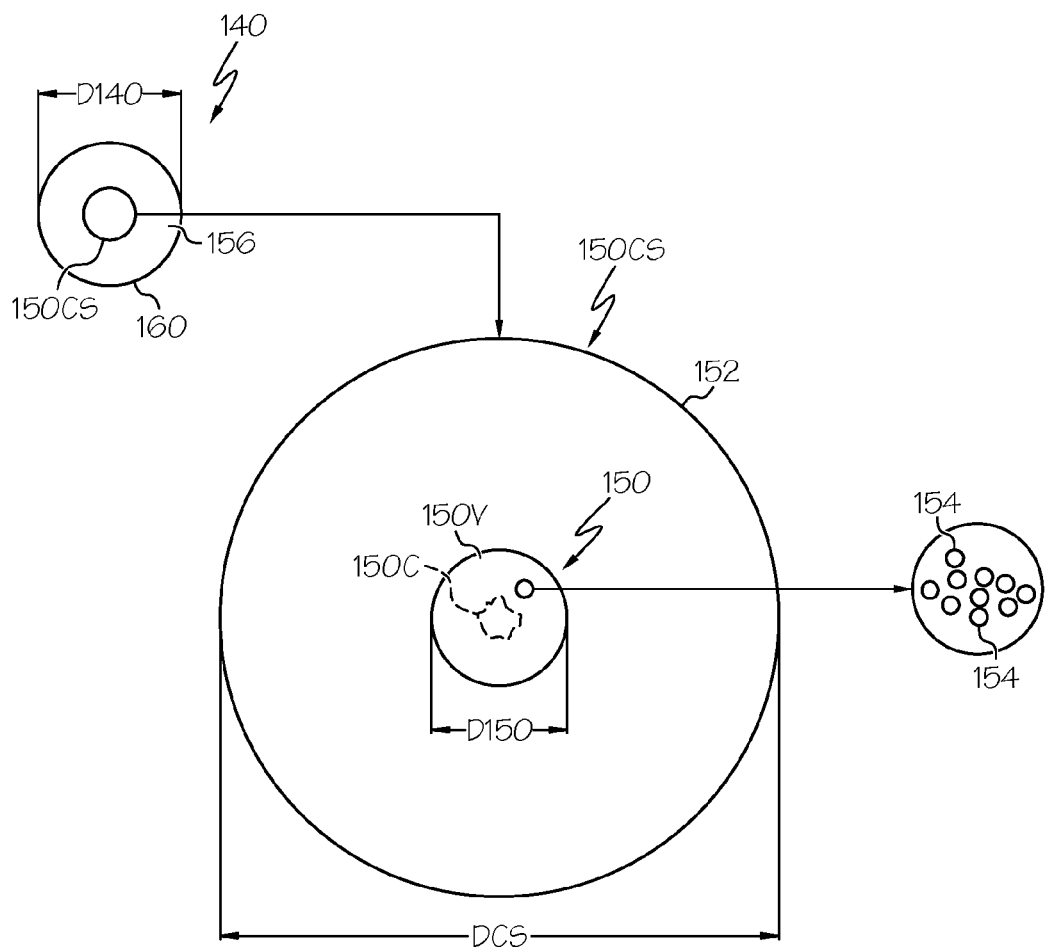
FIG. 2 schematically depicts a front sectional view of a light-diffusing optical fiber according to one or more embodiments shown or described herein.

FIG. 2 is a cross-sectional view of an example light-diffusing optical fiber 140 having a central core section ("core") 150CS, and an outer cladding 156, and showing in detail an example configuration for the core. Light-diffusing optical fiber 140 includes a center (or inner) core region 150 having a diameter D150, and an outer core region 152 that at least partially surrounds the center core region 150. The center core region 150 includes a central clear (solid) region 150C surrounded by an annular void region 150V that includes randomly arranged and randomly sized voids 154, as illustrated in the lower inset of FIG. 2. Light-diffusing optical fiber 140 also includes a cladding region 156 that surrounds core 150CS. In an example, cladding region 156 is made of low-index polymer while core 150CS comprises silica. The light-diffusing optical fiber 140 may also include a light scattering layer 160 positioned around the cladding region 156. The light scattering layer 160 may include a variety of phosphor materials that interact with the light scattered by the light-diffusing optical fiber 140 to modify the light, as discussed in further detail below.

Examples of light-diffusing optical fibers having randomly arranged and randomly sized voids 154 (also referred to as "random air lines" or "nanostructures" or "nano-sized structures") are described in U.S. Pat. No. 7,450,806, and in U.S. Patent Publication No. 2011/0122646, which patent and patent publication are incorporated by reference herein.

In an example, central clear region 150C of the light-diffusing optical fiber 140 has a nominal refractive index $n_{140}$ of about 1.46 at a wavelength of 550 nm. Also in an example, core diameter DCS is in the range from about 125 microns to 300 microns. Further in an example, the diameter D140 of light-diffusing optical fiber 140 is in the range from 0.2 mm (200 microns) to 0.6 mm (600 microns).

Light-diffusing optical fiber 140 can have a loss due to scattering that varies from 0.2 to 60 dB/m, depending on the particular configuration of center core region 150 and outer core region 152. However, as described in greater detail below, embodiments according to the present disclosure involve modifying the light-diffusing optical fiber 140 to obtain a greater loss, e.g., up to about 60 dB/m. Thus, in an example, light-diffusing optical fiber 140 can have a loss in the range from about 0.2 dB/m to about 60 dB/m, wherein the loss is substantially spectrally uniform in the wavelength range from 250 nm to 2,000 nm and, in another example, is substantially spectrally uniform over the visible wavelength or "white light" spectral range (e.g., nominally from 380 nm to 750 nm).

The light-diffusing optical fiber 140 may further include a coating layer, such as acrylate polymer material, that surrounds the cladding 156. The light-diffusing optical fiber 140 may also include a light scattering layer 160 that surrounds the coating layer. The light scattering layer 160 may include a light scattering material, for example, any solid particle, liquid droplet or gas bubble, or combination thereof, sized to scatter light. Specific examples of light scattering materials include phosphorous, $TiO_2$ particles, and doped polymers, such as white acrylate inks, for efficient scattering in angular space (i.e., uniform angular scattering).

Figure 3:
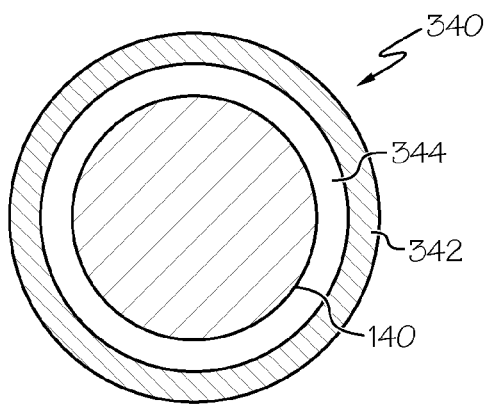
FIG. 3 schematically depicts a front sectional view of an optical fiber assembly according to one or more embodiments shown or described herein.

Referring now to FIG. 3, the light-diffusing optical fiber 140 may be incorporated into an optical fiber assembly 340 that includes the light-diffusing optical fiber 140 surrounded by a jacket 342. In some embodiments, the jacket 342 may be transparent or translucent, so that light emitted by the light-diffusing optical fiber 140 is transmitted in substantial portion through the jacket 342. In some embodiments, the jacket 342 may contact the light-diffusing optical fiber 140. In other embodiments, the jacket 342 may be spaced apart from the light-diffusing optical fiber in radial orientations so that a gap 344 is maintained between the jacket 342 and the light-diffusing optical fiber 140. In some embodiments, the jacket 342 may include phosphors that modify the color temperature of the light emitted by the light-diffusing optical fiber 140, as discussed in greater detail below.

Referring again to FIG. 1, the depicted embodiment of the lighting unit 100 further includes a transmission optical fiber 142 that is coupled to the light source 130 and the light-diffusing optical fiber 140. The transmission optical fiber 142 exhibits low light loss along its length, such that light in substantial portion delivered to one end is transmitted to a second end. In the embodiment of the lighting unit 100 depicted in FIG. 1, light emitted by the light source 130 is transmitted through the transmission optical fiber 142 to the light-diffusing optical fiber 140, which scatters the light into the surrounding environment. Because the transmission optical fiber 142 exhibits low light loss, light with sufficient intensity to illuminate the light-diffusing optical fiber 140 may be transmitted through the transmission optical fiber 142 over an extended distance, such that the light source 130 may be positioned at locations spaced apart from the light-diffusing optical fiber 140. In some embodiments, the light-diffusing optical fiber 140 may be separated from the light source 130 electrically, structurally, and optically other than through an optical connection with a transmission optical fiber 142.

Because light emitted by the light source 130 is scattered into the surrounding environment by the light-diffusing optical fiber 140, the light source 130 may be positioned at a location remote from the light-diffusing optical fiber 140. Accordingly, any thermal heat generated by the light source 130 may be transferred away from the light source 130 at positions remote from the light-diffusing optical fiber 140. The thermal temperature of the light-diffusing optical fiber 140, therefore, may remain substantially similar to the ambient temperature of the surrounding environment and the lighting unit may be described as a thermally "cool" lighting unit.

Figure 4:
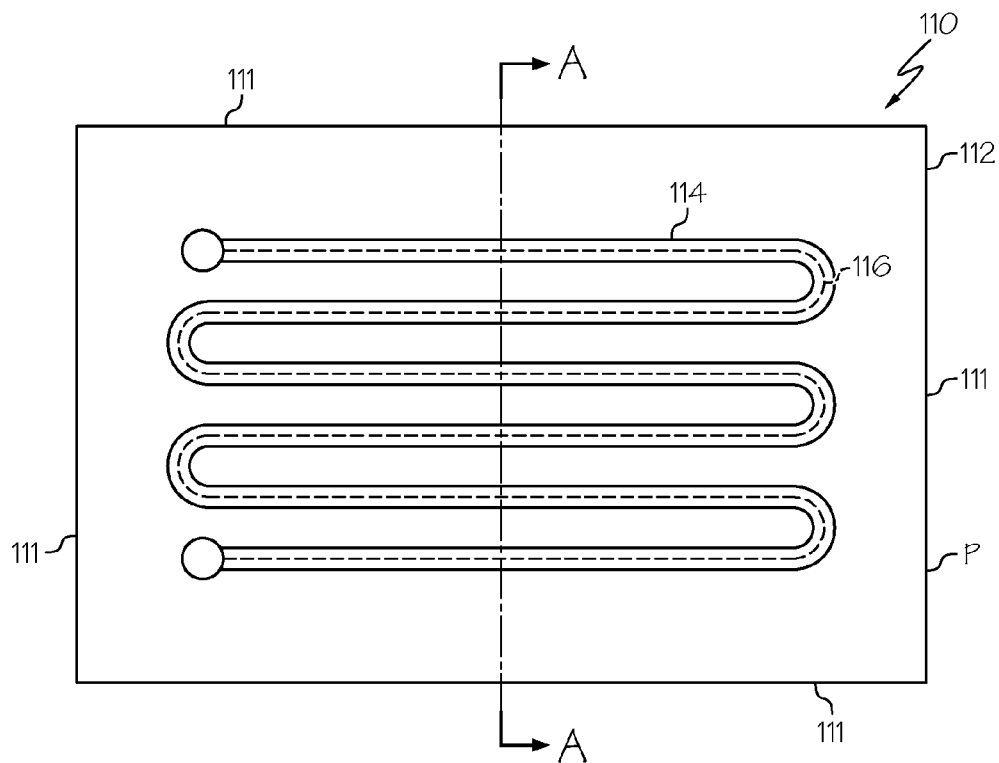
FIG. 4 schematically depicts a front view of a support plate for a lighting unit according to one or more embodiments shown or described herein.
Figure 5:
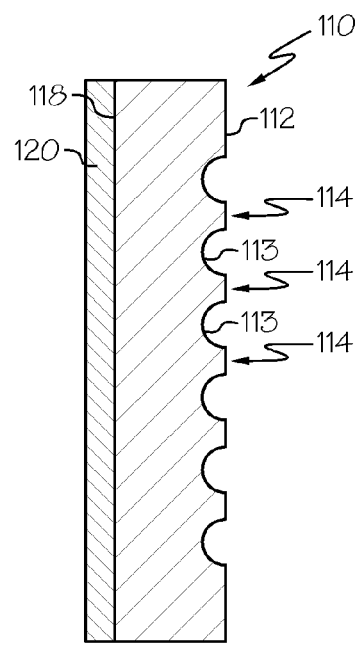
FIG. 5 schematically depicts a side sectional view of the support plate of FIG. 4 shown along line A-A of FIG. 4 according to one or more embodiments shown or described herein.

Referring now to FIGS. 4 and 5, one embodiment of the support plate 110 is depicted. In this embodiment, the support plate 110 includes a retention groove 114 positioned along a first surface 112 of the support plate 110. In the depicted embodiment, the retention groove 114 incorporates an arcuate portion 113, here a generally semi-cylindrical shape, that is debossed into the first surface 112 of the support plate 110. The arcuate portion 113 of the retention groove 114 may be sized and shape to generally correspond to the size and shape of the light-diffusing optical fiber 140. In some embodiments, the retention groove 114 may be shaped to generally conform to the shape of the light-diffusing optical fiber 140. In some embodiments, the retention groove 114 may be dimensionally over-sized relative to the light-diffusing optical fiber 140.

The retention groove 114 extends a groove length 116, evaluated as the length of the retention groove 114 along the first surface 112. Some embodiments of the support plate 110 may include a mirrored (i.e., reflective) portion 120 positioned proximate to the second surface 118 of the support plate 110 opposite the retention groove 114. Some embodiments of the support plate 110 may include shaped portions 120' positioned to direct the reflected light into a desired, predetermined pattern. Further, some embodiments of the support plate 110 may include white or colored regions 120" (i.e., filter or coating portions, for example, dichroic filter regions or filter portions) situated along at least one of the first or second surfaces 112, 118 of the support plate 110 that only reflect light in predetermined wavelength regions (e.g., red, blue, orange, green, etc.). Some embodiments of the support plate 110 may include shaped to direct the reflected light into a desired, predetermined pattern. Further, some embodiments of the support plate 110 may include textured or roughened regions along at least one of the first or second surfaces 112, 118 of the support plate 110. The textured regions may assist with scattering light provided by the light-diffusing optical fiber 140. The textured regions of the support plate 110 may include surface enhancers that are molded into at least one of the first or second surfaces 112, 118. The surface enhancers may be nominally sized in a range from about 1 um to about 1 mm. The surface enhancers may scatter light that is optically coupled into the support plate 110. In addition, or in the alternative, the textured regions of the support plate 110 may include a plurality of microlenses, which may be molded into the first or second surfaces 112, 118 of the support plate 110. The microlenses may direct the scattered light from the light-diffusing optical fiber 140, thereby increasing the intensity of the light scattered from the support plate 110. The microlenses may have a height less than about 100 um and may have diameters in a range from about 1 mm to about 2 mm. The textured regions and/or surface enhancing regions may be utilized in conjunction with the white or colored regions 120" (for example, dichroic filter regions), or include filter/coatings structured to reflect, transmit or absorb light in predetermined wavelength(s) bands (e.g., red, yellow, blue, orange, green, etc.).

While specific mention has been made hereinabove to surface enhancers that are positioned along the support plate 110, it should be understood that various embodiments of the lighting units 100 may include surface enhancers on one or more of the support plate 110 or the cover plate 180, as will be described in greater detail below.

The first and second surfaces 112, 118 of the support plate 110 (i.e., top and bottom) may be substantially planar and substantially parallel surfaces, and include one or more edges 111, such as four edges 111 for a rectangular transparent sheet as depicted in FIG. 4. Alternatively, the support plate 110 may be circular or elliptical in shape and include one edge 111. The collective edges 111 of the support plate 110 define the perimeter P of the support plate 110. Similarly, the collective edges of the cover plate, which is discussed in further detail below, define the perimeter of the cover plate. The support plate 110 and the cover plate may be made of, for example, glass, plastic, display glass such as Corning's EAGLE XG®, EAGLE®, GORILLA®, PYREX® and WILLOW™ glasses, as well as fused silica, plastic materials like PPMA or any other suitable material. In some embodiments, the support plate 110 and/or the cover plate may be made from a scratch-resistant glass. In some embodiments, the support plate 110 and/or the cover plate are transparent, translucent, or opaque. In some embodiments, the support plate 110 and/or the cover plate may be flexible, thereby allowing the support plate 110 and the cover plate to be oriented into configurations other than flat planar configurations, including contoured or curved configurations.

In some embodiments, a color modification layer may be coupled to the support plate 110, where the color-modification, having a phosphor that illuminates at a wavelength different than the light emitted by the light-diffusing optical fiber, or an alternative color modification substance that modifies the light emitted by the light-diffusing optical fiber. When combined into an assembly with the support plate 110 and the light-diffusing optical fiber 140, the color modification layer modifies the wavelength of the light emitted by the light-diffusing optical fiber 140 so that the light cast by the lighting unit 100 appears to have a particular color cast. The substance embedded in the color modification layer may be selected to provide the desired color cast of light cast by the lighting unit 100.

In an example, the thickness of the support plate 110 is 0.3 mm or greater, and in another example is 0.7 mm or greater. In an example, support plate 110 has a refractive index $n_{110}$ of about 1.5 or greater at 550 nm.

In some embodiments, light scattered from the light-diffusing optical fiber 140 is directed into the support plate 110 through the retention groove 114. The light directed into the support plate 110 may reflect within the support plate 110 through total internal reflection, such that light introduced to the support plate 110 from the light-diffusing optical fiber 140 scatters within the support plate 110 and is reflected in substantial portion throughout the support plate 110. The light captured within the support plate 110 through total internal reflection thereby illuminates the support plate 110.

As depicted in FIG. 4, the retention groove 114 is debossed into the first surface 112 in a serpentine arrangement. The retention groove 114 extends a groove length 116 along the first surface 112. In the embodiment depicted in FIG. 4, the groove length 116 is greater than the perimeter P of the support plate 110. By incorporating a retention groove 114, having a groove length 116 greater than the perimeter P of the support plate 110, the length of light-diffusing optical fiber 140 positioned within the retention groove 114 along the first surface 112 of the support plate 110 may be similarly greater than the perimeter P of the support plate 110. By increasing the length of the retention groove 114, and the corresponding effective length of the light-diffusing optical fiber 140, the light emitted by the lighting unit 100 may be controlled to provide the desired uniformity. Further, incorporation of such a retention groove 114 may allow for orienting the light-diffusing optical fiber 140 in a manner that improves the aesthetics of the lighting unit 100.

Additionally, incorporating a retention groove 114 into the support plate 110 in which the retention groove 114 has a groove length 116 greater than the perimeter P of the support plate 110 may allow for coupling a length, $L_{LDF}$, of light-diffusing optical fiber 140 that is greater than the length of the perimeter P. Additionally, a ratio of the length of the light-diffusing optical fiber 140 to the surface area of the support plate 110 circumscribed by the perimeter P may be greater than the ratio of the perimeter P to the surface area of the support plate 110 circumscribed by the perimeter P. By increasing the ratio of the length of the light-diffusing optical fiber 140 to the surface area of the support plate 110 circumscribed by the perimeter P, light emitted by the lighting unit 100 may be enhanced for the given size of the support plate 110. In particular, lighting units 100 that have high ratios of the length $L_{LDF}$ of the light-diffusing optical fiber 140 to the surface area of the support plate 110 circumscribed by the perimeter P may deliver light to the surrounding environment with high lumens per unit area of the support plate 110.

In some embodiments, the relative ratio of the length $L_{LDF}$ of the light-diffusing optical fiber 140 to the surface area of the support plate 110 circumscribed by the perimeter P may be high, indicating that the light-diffusing optical fiber 140 is densely packed along the support plate 110. The relative ratio between the length $L_{LDF}$ of the light-diffusing optical fiber 140 and the perimeter P of the support plate 110 may define a packing factor, PF, where $PF=L_{LDF}/P$. Embodiments according to the present disclosure may have packing factors greater than 1, including packing factors in a range from about 1 to about 20, including packing factors in a range from about 2 to about 6.

Figure 6:
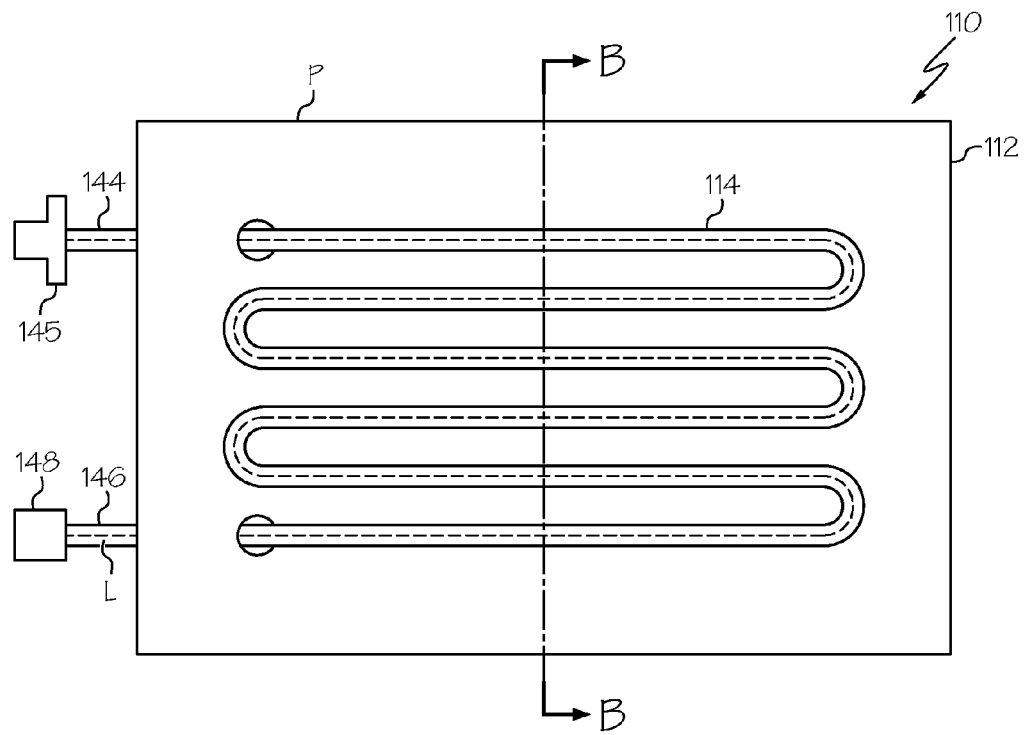
FIG. 6 schematically depicts a front view of a support plate and a light-diffusing optical fiber for a lighting unit according to one or more embodiments shown or described herein.
Figure 7:
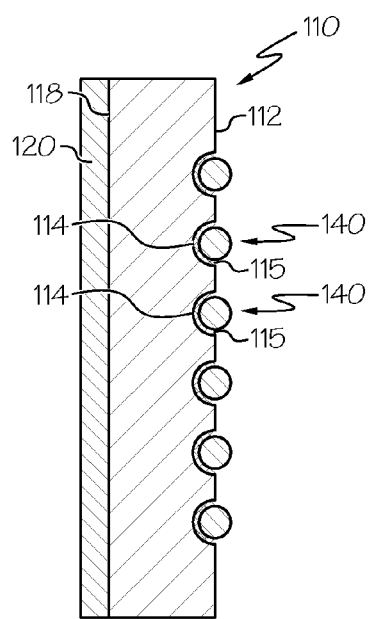
FIG. 7 schematically depicts a side sectional view of the support plate and the light-diffusing optical fiber of FIG. 6 shown along line B-B of FIG. 6 according to one or more embodiments shown or described herein.

Referring now to FIGS. 6 and 7, an embodiment of the lighting unit 100 that includes a support plate 110 having a retention groove 114 that extends along the first surface 112 of the support plate 110. In the embodiment depicted in FIGS. 6 and 7, the light-diffusing optical fiber 140 is positioned proximate to the retention groove 114 and is secured to retention groove 114 with a bonding agent 115. The bonding agent 115 may be selected from a variety of commercially available bonding agents including, for example and without limitation, adhesives or cements. In some embodiments, the bonding agent 115 may include an index-matching material. The index-matching material may have a refractive index $n_{115}$ similar to at least one of the light-diffusing optical fiber 140 or the support plate 110. Example index-matching materials include polymer-based glues, photo-curable polymers, and epoxy glues. The bonding agent 115 may resiliently couple the light-diffusing optical fiber 140 to the retention groove 114 of the support plate 110 so that the support plate 110 may be arranged in a variety of positions and orientations without the light-diffusing optical fiber 140 separating from the support plate 110.

Coupling the light-diffusing optical fiber 140 to the support plate 110 in the retention groove 114 may increase the proportion of light that is scattered from the light-diffusing optical fiber 140 and is directed into the support plate 110 as compared with conventional designs in which the light-diffusing optical fiber 140 is coupled to a planar surface of the support plate 110. In particular, the arcuate shape of the retention groove 114 may increase the adjacent areas of the support plate 110, while decreasing the average distance between the light-diffusing optical fiber 140 and the support plate 110.

Further, by selecting materials with particular refractive indexes for use as the light-diffusing optical fiber 140, the support plate 110, and the bonding agent 115 may provide improved light capture performance from the light-diffusing optical fiber 140 into the support plate 110. The light scattered by the light-diffusing optical fiber 140 may, therefore, be captured in the support plate 110 with a high efficiency, thereby reducing the light output requirement of the light-diffusing optical fiber 140. In one embodiment, the refractive index $n_{115}$ of the bonding agent 115 may be between the refractive index of the light-diffusing optical fiber 140 and the support plate 110, e.g., $n_{140}<n_{115}<n_{110}$.

In an example, light-diffusing optical fiber 140 includes a coupling end 144 and a terminal end 146. Coupling end 144 and terminal end 146 define a length L for light-diffusing optical fiber 140. The coupling end 144 and/or the terminal end 146 of the light-diffusing optical fiber 140 may include connectors 145 that allow for optical coupling of the light-diffusing optical fiber 140 with a remotely positioned light source (as shown in FIG. 1), other light-diffusing optical fibers 140, or transmission optical fiber 142 (as shown in FIG. 1). In the embodiment depicted in FIGS. 6 and 7, the coupling end 144 of the light-diffusing optical fiber 140 is optically coupled to light source, so that light emitted by the light source travels in light-diffusing optical fiber 140 as guided light. In one example, terminal optical member 148 is an optical absorber that absorbs light, while in another example it is an optical reflector that reflects light so that the reflected guided light travels down the light-diffusing optical fiber 140 in the opposite direction, i.e., toward light source 130. In such an example, an optical isolator (not shown) may be employed (e.g., adjacent to the light source) to prevent light from returning to the light source.

Figure 8:
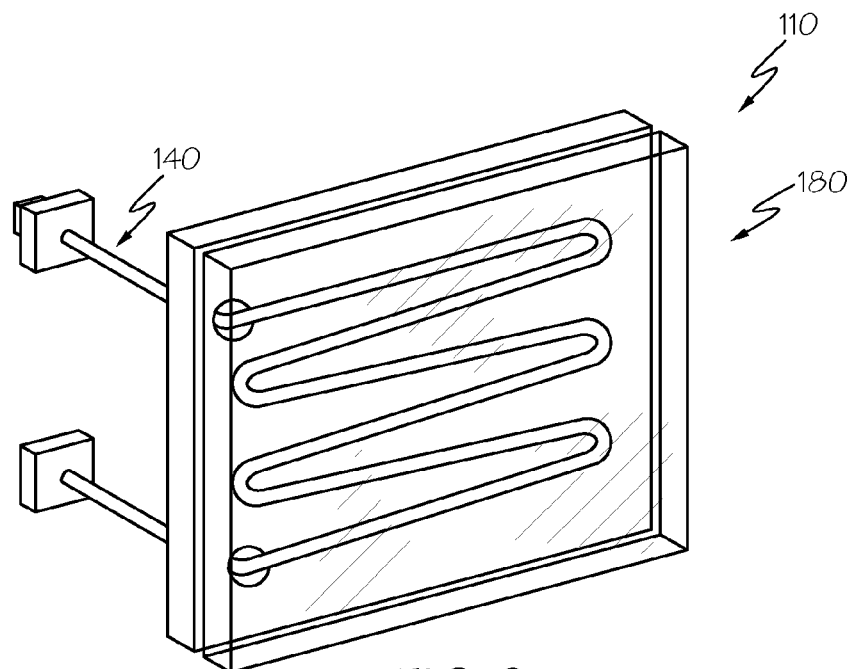
FIG. 8 schematically depicts a side perspective view of a support plate, a light-diffusing optical fiber, and a cover plate for a light fixture according to one or more embodiments shown or described herein.

Referring now to FIG. 8, embodiments of the lighting unit 100 may incorporate a cover plate 180 positioned opposite the first surface 112 of the support plate 110 from the light-diffusing optical fiber 140. The cover plate 180 may diverge or concentrate the light scattered from the light-diffusing optical fiber 140 to modify the quality of light emitted by the lighting unit 100. Various embodiments of the cover plate may include a light shaping element 80 that modifies the light emitted by the light-diffusing optical fiber 140. A variety of configurations of cover plates having light shaping elements 80 may be incorporated into the lighting unit 100, examples of which are depicted in FIGS. 9-13.

Embodiments of the cover plate 180 may be transparent, translucent, opaque, or combinations thereof. The degree of opacity of the cover plate 180 may be determined by measuring the lumens of light input to the cover plate 180 and the lumens of light scattered by the cover plate. In one embodiment, the cover plate 180 may have a generally uniform opacity such that the opacity at any one location along the cover plate 180 varies less than or equal to about 10% of the median opacity across the cover plate 180. In some embodiments, the cover plate 180 may include a diverging lens that further scatters light that is scattered from the light-diffusing optical fiber 140. In some embodiments, the cover plate 180 may include a focusing lens that focuses light that is scattered from the light-diffusing optical fiber 140.

Figure 9:
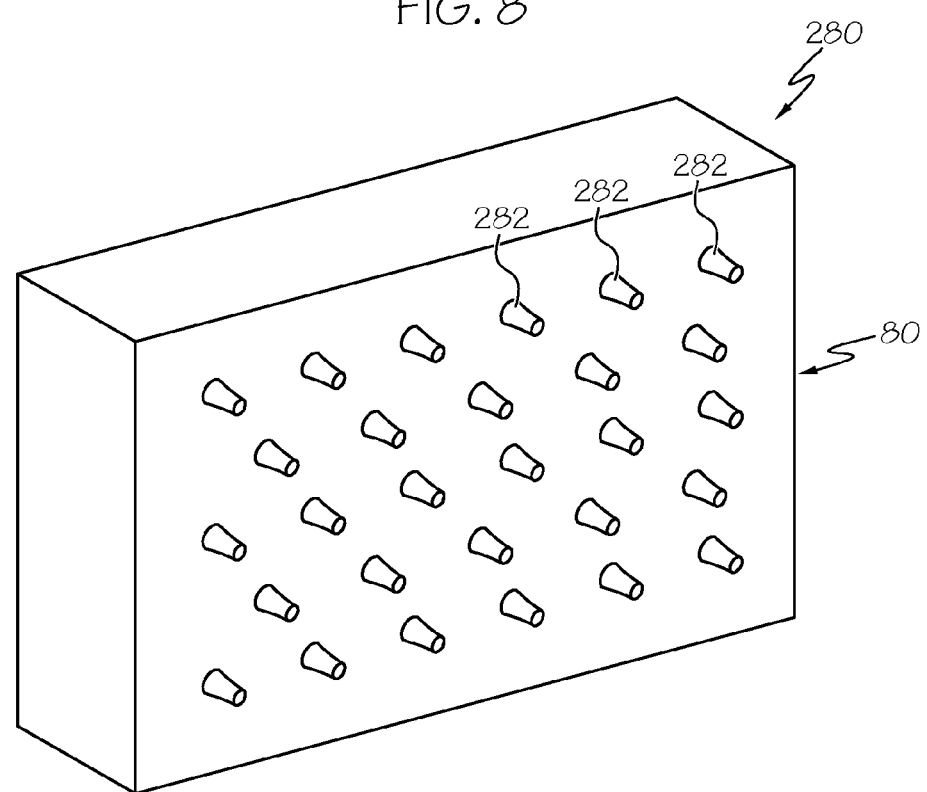
FIG. 9 schematically depicts a side perspective view of a cover plate for a light fixture having a plurality of collimating elements according to one or more embodiments shown or described herein.

Referring now to FIG. 9, one example of a cover plate 280 having a plurality of collimating elements 282 is depicted. In the embodiment depicted in FIG. 9, the collimating elements 282 extend away from the cover plate 280 in an orientation that projects away from the light-diffusing optical fiber 140 (see FIG. 8). However, it should be understood that the collimating elements 282 may be positioned in a variety of orientations based on a particular end-user application. The collimating elements 282 may narrow the light scattered from the light-diffusing optical fiber 140 so that a plurality of high-intensity regions of light (corresponding to the plurality of collimating elements 282) are directed from the lighting unit 100 into the surrounding environment. The light emitted by the collimating elements 282 may be emitted in a pattern suited for the particular end-user application.

Figure 10:
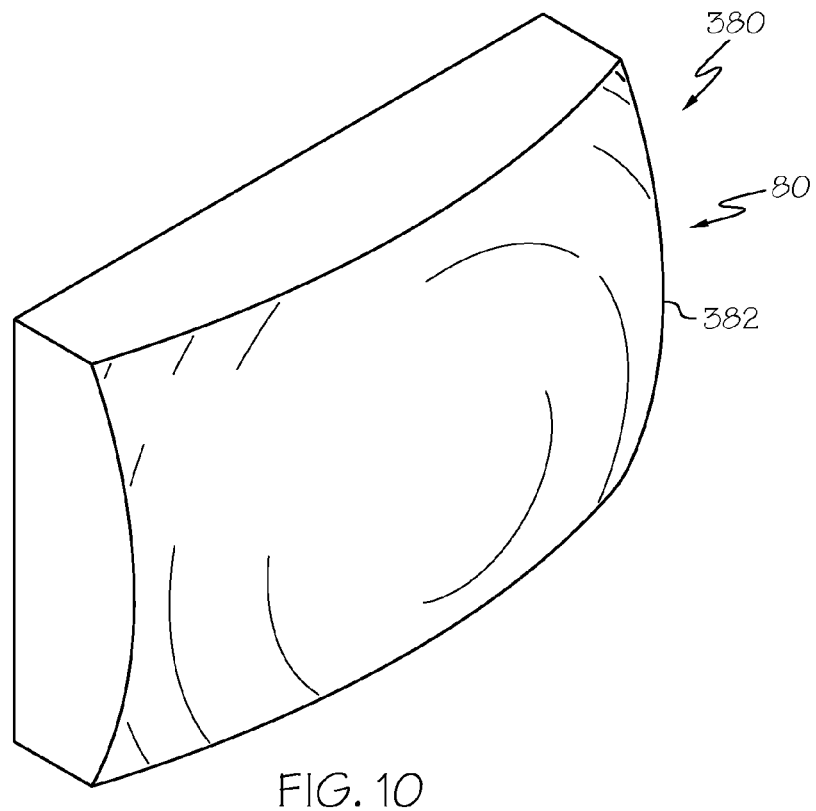
FIG. 10 schematically depicts a side perspective view of a cover plate for a light fixture having a concentrating lens according to one or more embodiments shown or described herein.

Referring now to FIG. 10, another example of a cover plate 380 that incorporates a concentrating lens 382 is depicted. In this embodiment, light scattered from the light-diffusing optical fiber may be converged by the concentrating lens 382 such that the light that exits the cover plate 380 is focused at a position spaced apart from the cover plate 380.

Figure 11:
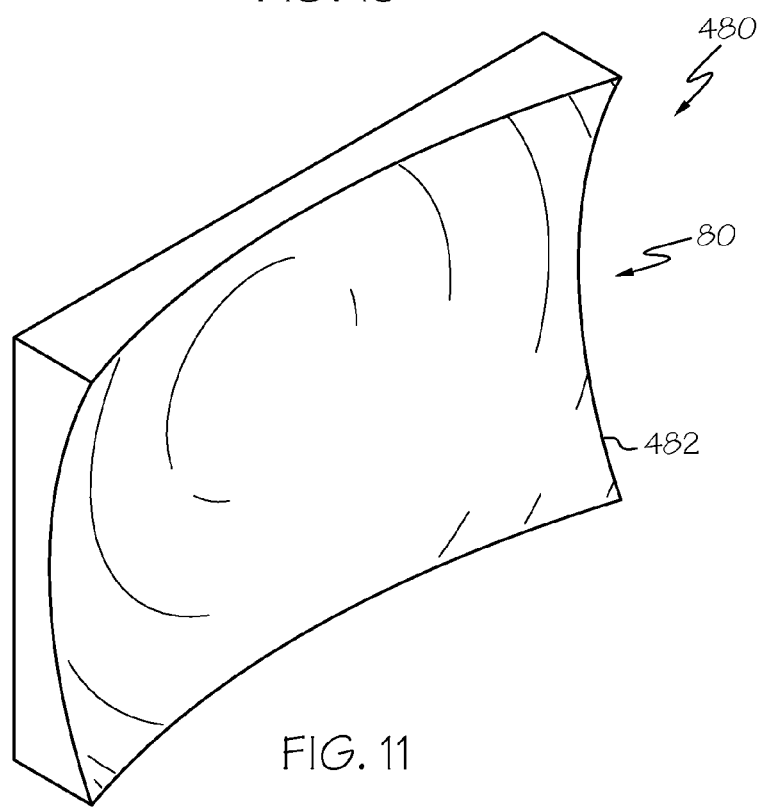
FIG. 11 schematically depicts a side perspective view of a cover plate for a light fixture having a diverging lens according to one or more embodiments shown or described herein.

Referring now to FIG. 11, another example of a cover plate 480 that includes a diverging lens 482 is depicted. In this embodiment, light scattered from the light-diffusing optical fiber may be diverged by the diverging lens 482 such that the light that exits the cover plate 480 is defocused at positions spaced apart from the cover plate 480.

Figure 12:
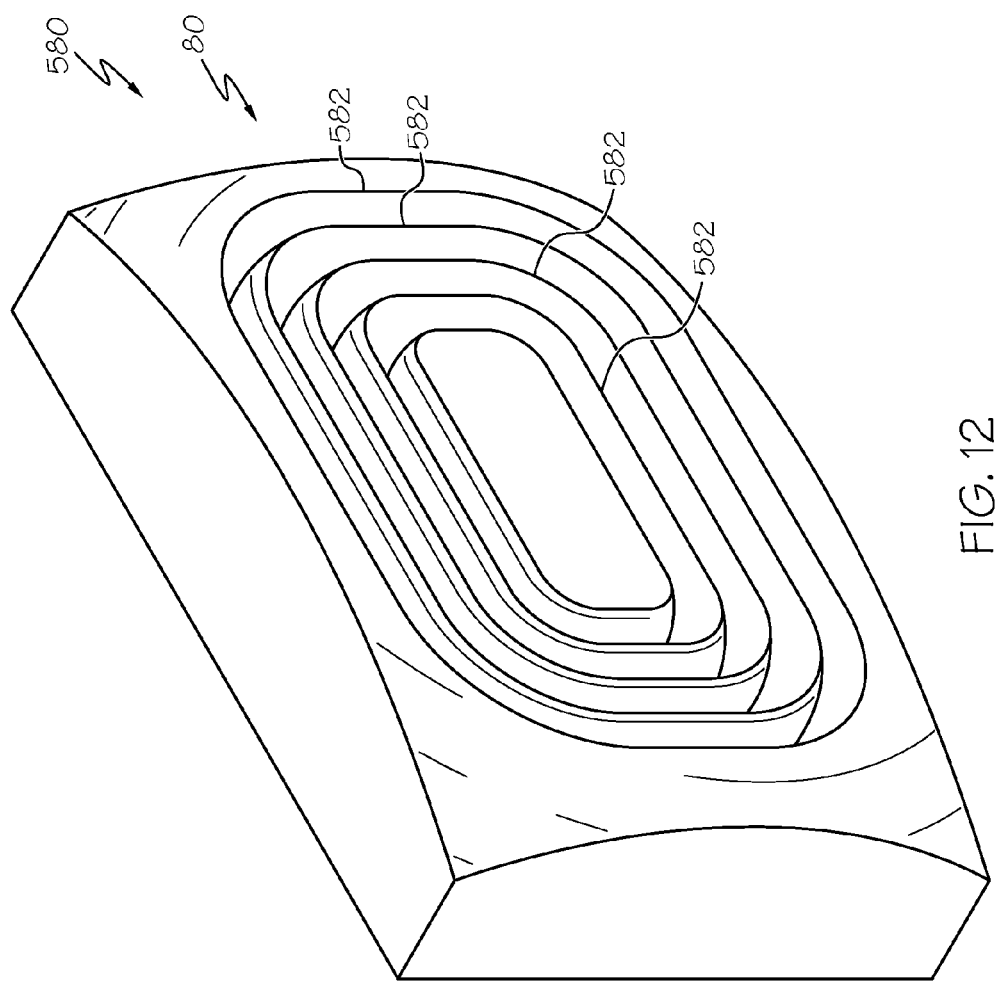
FIG. 12 schematically depicts a side perspective view of a cover plate for a light fixture having a plurality of Fresnel elements according to one or more embodiments shown or described herein.

Referring now to FIG. 12, another example of a cover plate 580 that includes a plurality of Fresnel elements 582 is depicted. The Fresnel elements 582 may either focus or defocus the light that exits the cover plate 580. The cover plate 580 incorporating the plurality of Fresnel elements 582 may concentrate or diverge the light from the light-diffusing optical fiber a similar amount to cover plates 380, 480 depicted in FIGS. 10 and 11, respectively. However, the cover plate 580 having a plurality of Fresnel elements 582 may have a thinner profile than the cover plates 380, 480 depicted in FIGS. 10 and 11.

Figure 13:
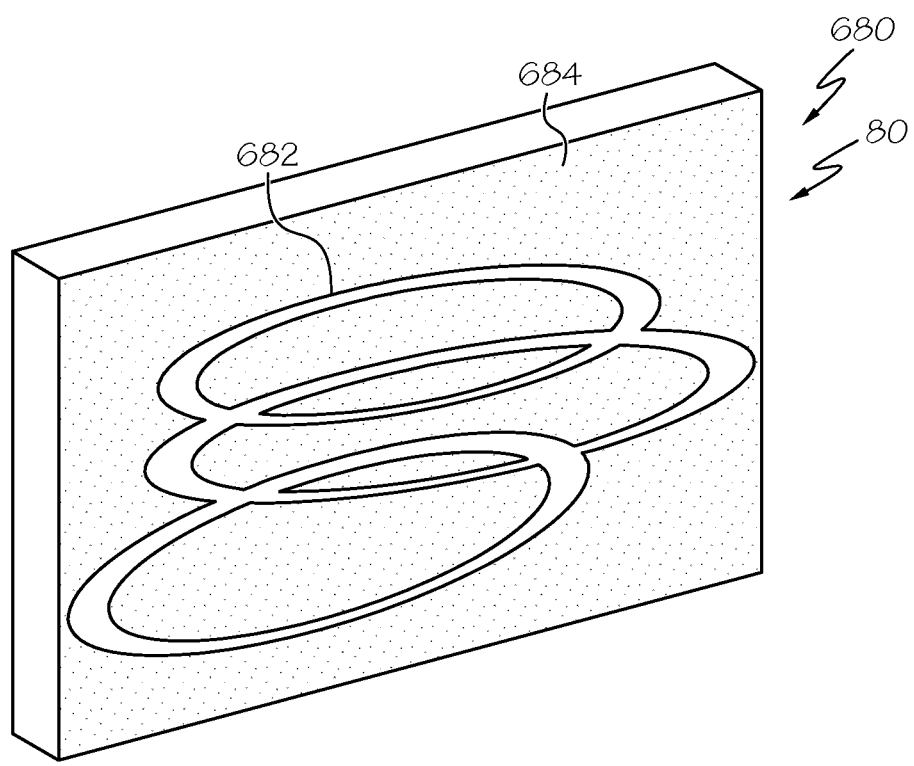
FIG. 13 schematically depicts a side perspective view of a cover plate for a light fixture according to one or more embodiments shown or described herein.

Referring now to FIG. 13, the cover plate 680 may include a plurality of regions of high opacity 682 and a plurality of regions of low opacity 684 adjacent to the regions of high opacity 682. The regions of high opacity 682 and the regions of low opacity 684 of the cover plate 680 may modify the light scattered from the light-diffusing optical fiber into higher intensity regions and lower intensity regions, or may modify the color of the light scattered from the light-diffusing optical fiber. Additionally, the regions of high opacity 682 and the regions of low opacity 684 of the cover plate 680 may improve the aesthetics of the lighting unit to which the cover plate 680 is coupled.

Figure 14:
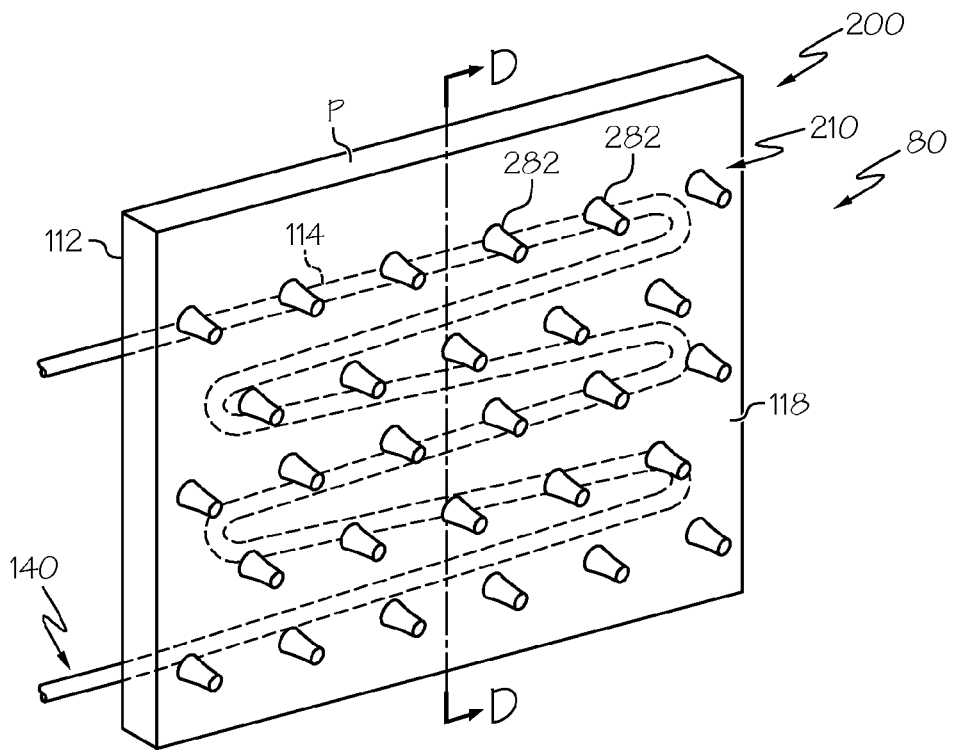
FIG. 14 schematically depicts a side perspective view of a lighting unit having light-diffusing optical fiber according to one or more embodiments shown or described herein.
Figure 15:
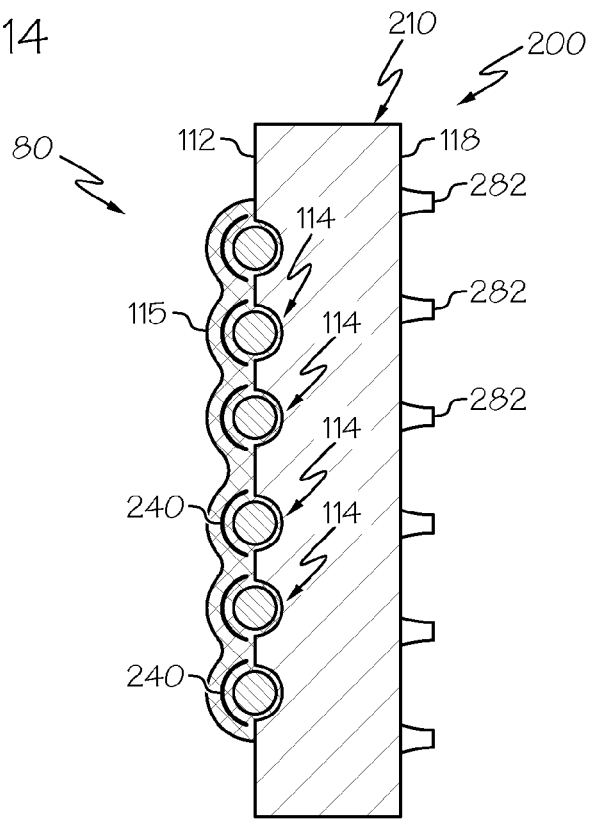
FIG. 15 schematically depicts a side sectional view of a lighting unit shown along line D-D of FIG. 14 according to one or more embodiments shown or described herein.

Referring now to FIGS. 14 and 15, another embodiment of the lighting unit 200 is depicted. In this embodiment, the lighting unit 200 includes a support plate 210 having a retention groove 114 debossed into a first surface 112 of the support plate 210. The support plate 210 also includes a plurality of collimating elements 282 positioned along the second surface 118 opposite the first surface 112. Light-diffusing optical fiber 140 is positioned within the retention groove 114 of the support plate 210. Some embodiments of the lighting unit 200 may include a reflector 240 positioned opposite the light-diffusing optical fiber 140 from the support plate 210. Light directed along the light-diffusing optical fiber 140 is scattered from the light-diffusing optical fiber 140 and is introduced to the support plate 210. The reflector 240 may direct light scattered from the light-diffusing optical fiber 140 away from the support plate 210 back into the support plate 210 through the bonding agent 115. The scattered light may illuminate the support plate 210 through total internal reflection. With the support plate 210 illuminated, light reflecting inside the support plate 210 may be directed through the collimating elements 282 and away from the second surface 118 of the support plate 210.

Similar to the embodiments of the cover plates 180, 280, 380, 480, 580, 680 depicted in FIGS. 8-13, it should be understood that various embodiments of the cover plates (not shown) may incorporate a variety of reflective, collimating, concentrating, or diffusing features into the cover plate to scatter light provided by the light-diffusing optical fiber without departing from the scope of the present disclosure.

Figure 16:
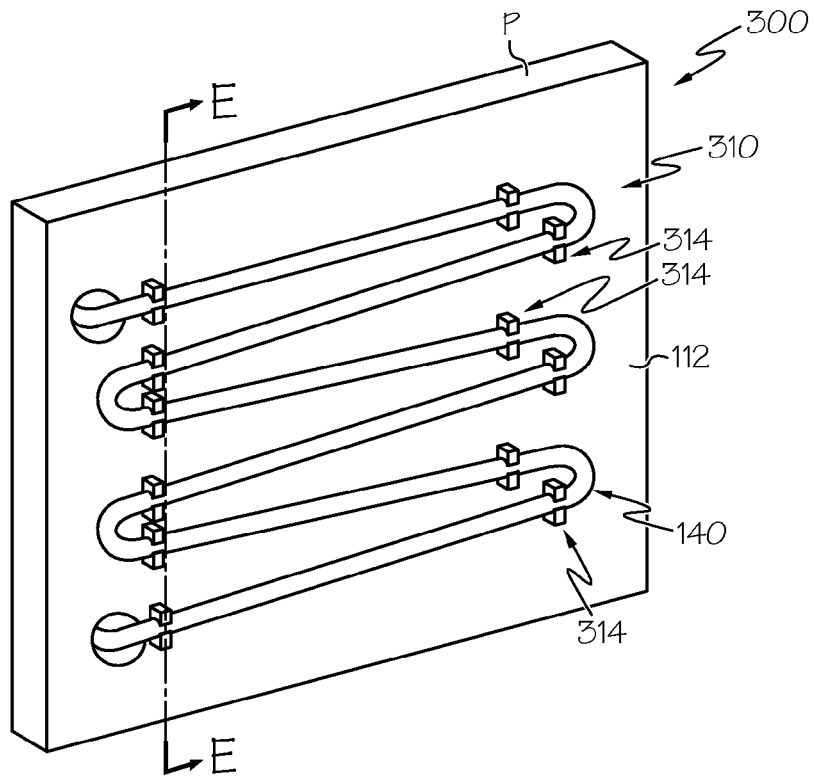
FIG. 16 schematically depicts a side perspective view of a lighting unit having light-diffusing optical fiber according to one or more embodiments shown or described herein.
Figure 17:
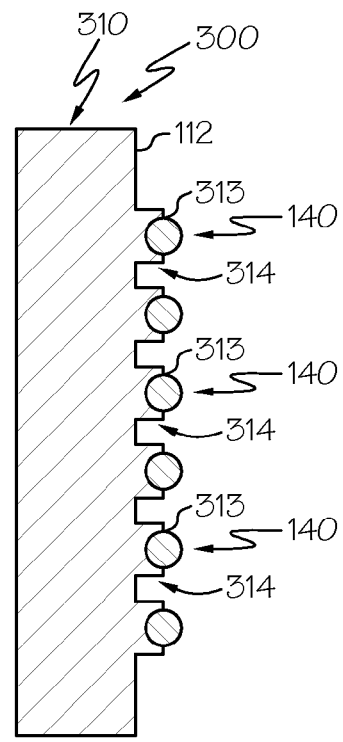
FIG. 17 schematically depicts a side sectional view of a lighting unit shown along line E-E of FIG. 16 according to one or more embodiments shown or described herein.

Referring now to FIGS. 16 and 17, another embodiment of a lighting unit 300 having a support plate 310 is depicted. In this embodiment, the support plate 310 includes a plurality of retention bosses 314 arranged along a first surface 112 of the support plate 310. The retention bosses 314 include a plurality of groove portions 313. The light-diffusing optical fiber 140 may be coupled to the groove portions 313 of the retention bosses 314, so that the light-diffusing optical fiber 140 is coupled to the support plate 310. The light-diffusing optical fiber 140 may be coupled to the groove portions 313 by a variety of techniques, including those discussed above with regard to the generally uninterrupted retention groove 114.

The retention bosses 314 may be configured along the first surface 112 of the support plate 310 so that the light-diffusing optical fiber 140 may be maintained in a predetermined configuration relative to the support plate 310. In embodiments according to the present disclosure, the length of the light-diffusing optical fiber 140 positioned inside of the perimeter P of the support plate 310 is greater than the perimeter P of the support plate 310.

Figure 18:
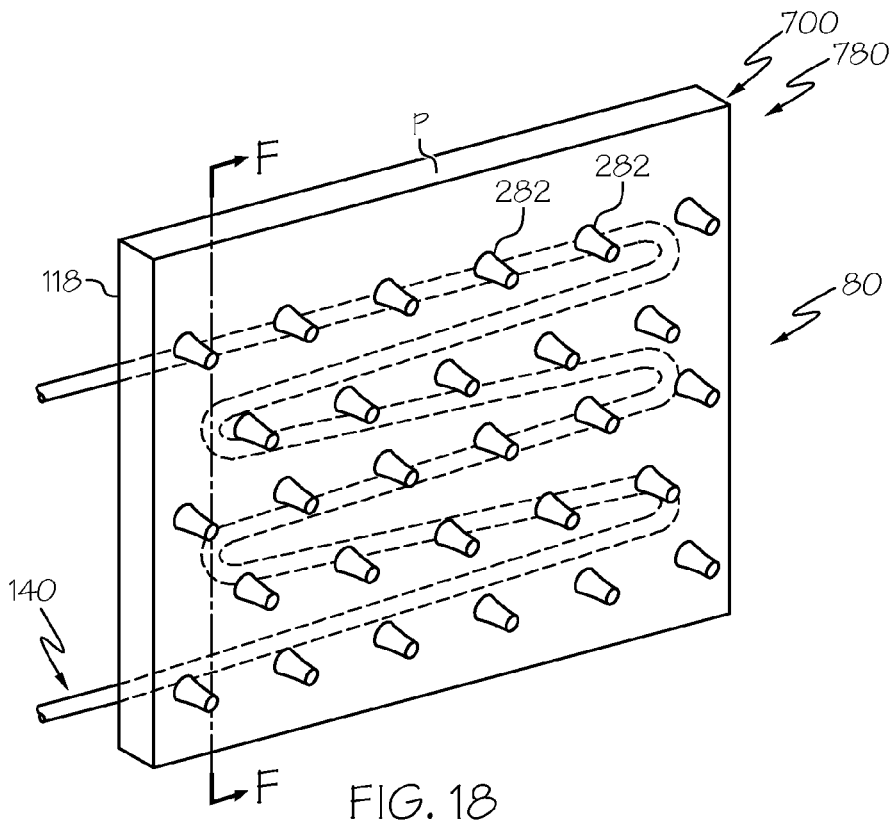
FIG. 18 schematically depicts a side perspective view of a lighting unit having light-diffusing optical fiber according to one or more embodiments shown or described herein.
Figure 19:
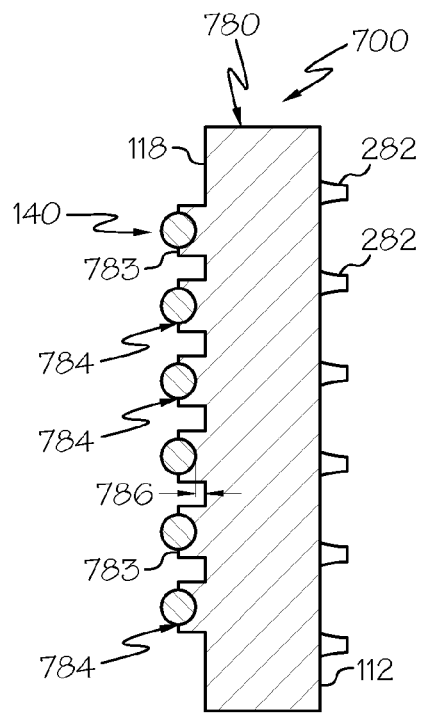
FIG. 19 schematically depicts a side sectional view of a lighting unit shown along line F-F of FIG. 18 according to one or more embodiments shown or described herein.

Referring now to FIGS. 18 and 19, another embodiment of a lighting unit 700 is depicted. In this embodiment, the lighting unit 700 includes a cover plate 780 to which the light-diffusing optical fiber 140 is coupled. The cover plate 780 includes at least one light shaping element 80, depicted here as a plurality of collimating elements 282 that are arranged along a first side 112 of the cover plate 780. It should be understood that lighting units 700 according to the present disclosure may include any of the light shaping elements 80 described hereinabove.

The cover plate 780 also includes a plurality of retention bosses 784 positioned along the second side 118 of the cover plate 780 opposite the first side 112 of the cover plate 780. The retention bosses 784 include a plurality of groove portions 783 into which the light-diffusing optical fiber 140 is coupled. In embodiments according to the present disclosure, the retention bosses 784, and therefore the groove portions 783, may be continuous along the length of the light-diffusing optical fiber 140 (similar to the retention groove incorporated in the embodiments of the support plate depicted in FIGS. 4-7) or discontinuous along the length of the light-diffusing optical fiber 140 (similar to the groove portions incorporated in the embodiment of the support plate depicted in FIGS. 16 and 17). The retention bosses 784 and the groove portions 783 may be arranged in a variety of configurations along the second side 118 of the cover plate 780 so that the length of the light-diffusing optical fiber 140 positioned inside of the perimeter P of the cover plate 780 is greater than the perimeter P of the cover plate 780. The retention bosses 784 and the groove portions 783 may maintain a spacing distance 786 between the light-diffusing optical fiber 140 and the second surface 118 of the cover plate 780.

Figure 20:
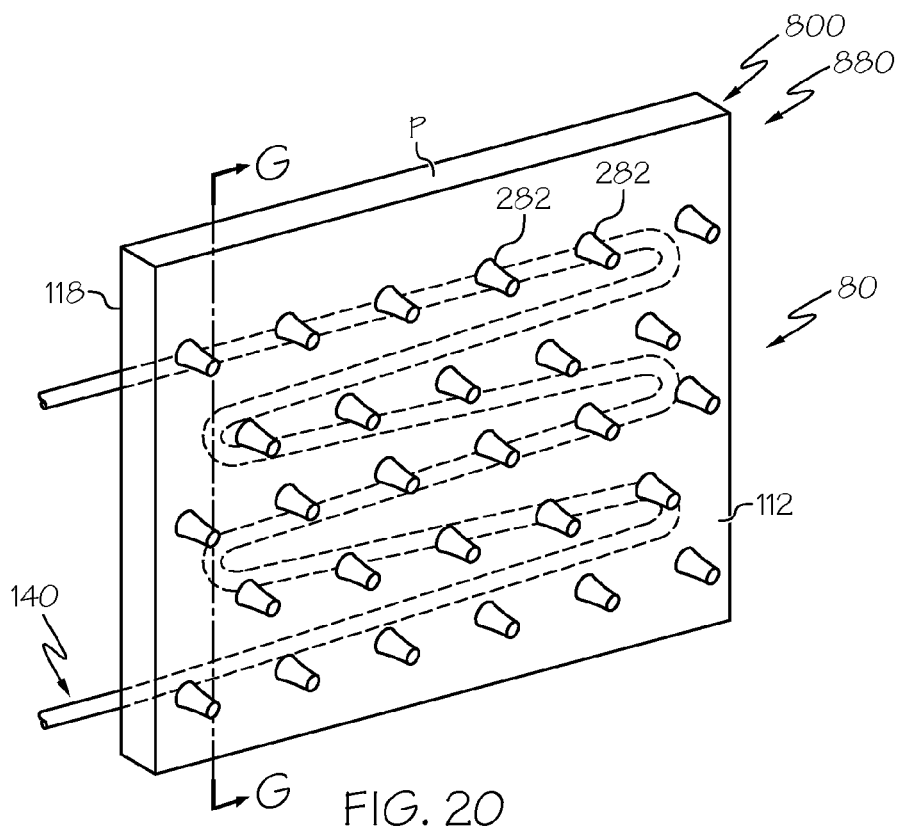
FIG. 20 schematically depicts a side perspective view of a lighting unit having light-diffusing optical fiber according to one or more embodiments shown or described herein.
Figure 21:
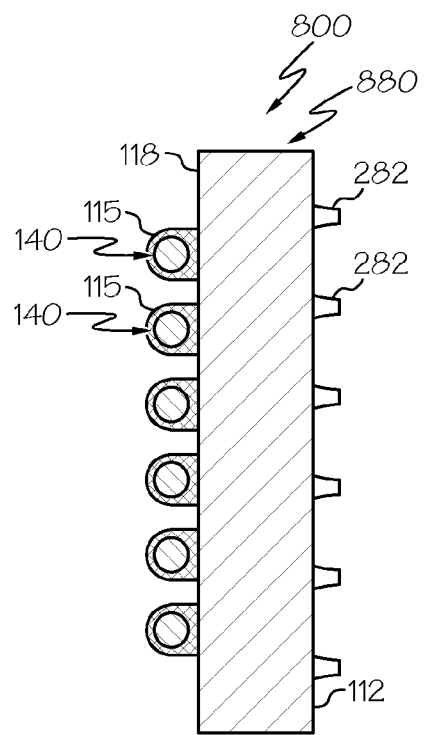
FIG. 21 schematically depicts a side sectional view of a lighting unit shown along line G-G of FIG. 20 according to one or more embodiments shown or described herein.

Referring now to FIGS. 20 and 21, another embodiment of a lighting unit 800 is depicted. In this embodiment, the lighting unit 800 includes a cover plate 880 to which the light-diffusing optical fiber 140 is coupled. The cover plate 880 includes at least one light shaping element 80, depicted here as a plurality of collimating elements 282 that are arranged along a first side 112 of the cover plate. It should be understood that lighting units 800 according to the present disclosure may include any of the light shaping elements 80 described hereinabove.

The light-diffusing optical fiber 140 may be coupled to a second side 118 of the cover plate 880 with a bonding agent 115. The bonding agent 115 may be arranged in continuous or interrupted sections along the length of the light-diffusing optical fiber 140. The light-diffusing optical fiber 140 and the bonding agent 115 may be arranged in a variety of configurations along the second side 118 of the cover plate 880 so that the length of the light-diffusing optical fiber 140 positioned inside of the perimeter P of the cover plate 880 is greater than the perimeter P of the cover plate 880.

Figure 22:
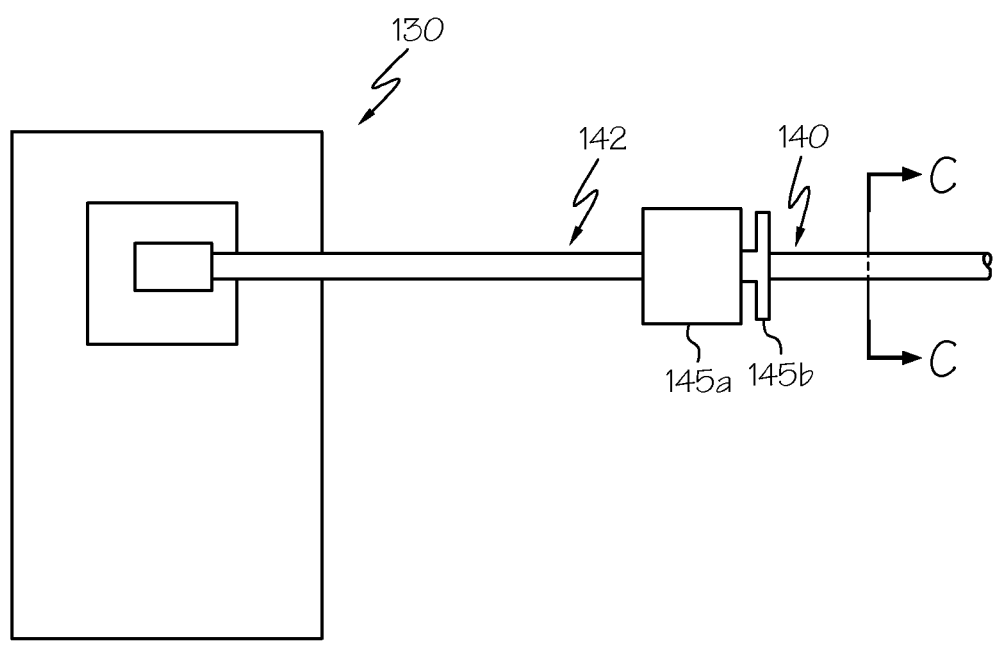
FIG. 22 schematically depicts a front view of a light source and a light-diffusing optical fiber according to one or more embodiments shown or described herein.
Figure 23:
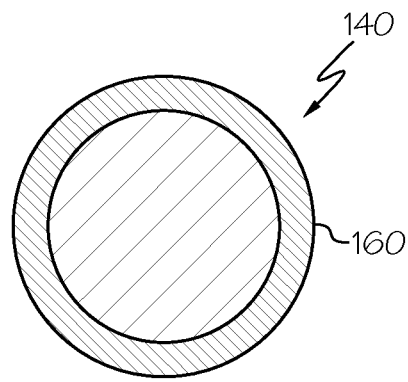
FIG. 23 schematically depicts a side sectional view of a light-diffusing optical fiber shown along line C-C of FIG. 22 according to one or more embodiments shown or described herein.
Figure 24:
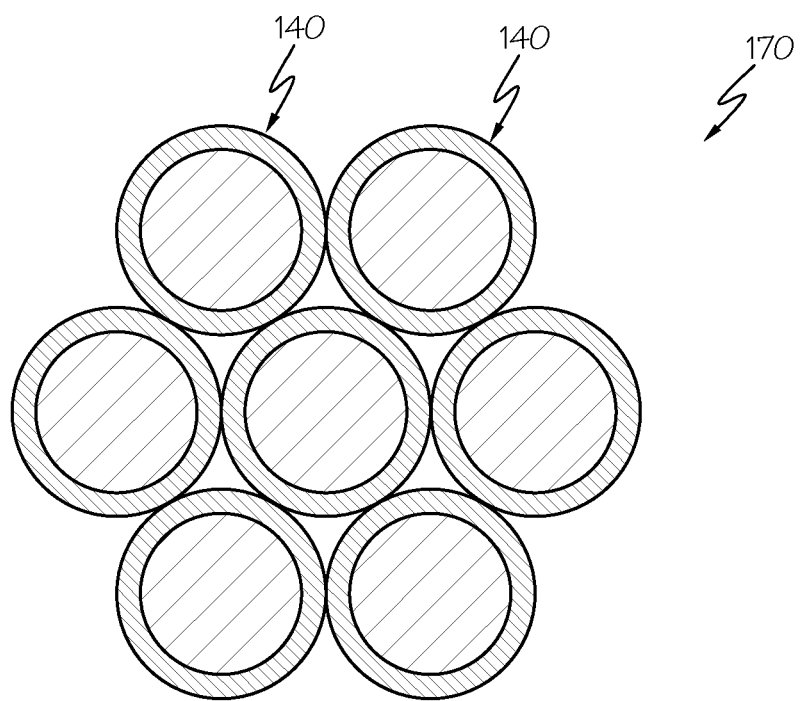
FIG. 24 schematically depicts a side sectional view of a light-diffusing optical fiber shown along line C-C of FIG. 22 according to one or more embodiments shown or described herein.

Referring now to FIGS. 22-24, configurations of the light-diffusing optical fiber 140 are depicted. In the embodiment depicted in FIG. 22, the light source 130 is optically coupled to the light-diffusing optical fiber 140 through a transmission optical fiber 142. The transmission optical fiber 142 and the light-diffusing optical fiber 140 may include connectors 145a, 145b that provide resilient attachment and repeatable positioning of the fibers to provide transmission of light across optical interfaces.

Referring to FIG. 23, the light-diffusing optical fiber 140 may include a light scattering layer 160, for example a phosphor light scattering layer. The light scattering layer 160 may interact with the light emitted along the light-diffusing optical fiber 140 so that the color of the light scattered from the light-diffusing optical fiber 140 may be modified to emit at a desired color temperature. In one example, the light source coupled to the light-diffusing optical fiber 140 may be a blue laser emitting light at a wavelength from about 400 nm to about 480 nm. Because the light produced by the blue laser is "cool" (i.e., greater than about 6500 K) as compared with daylight (i.e., about 6500 K), the light emitted by the blue laser may be modified with a phosphor that shifts the light to lower color temperatures, resulting in a "warmer" light (i.e., approaching about 6500 K) emitted by the light-diffusing optical fiber 140 than the blue laser. In one embodiment, Ce:YAG phosphors are used to modify the color temperature of the light emitted by the light-diffusing optical fiber 140 so that the color temperature approaches a neutral white light (i.e., approaching 6500 K). In some embodiments, red phosphors based on Eu2+ in CaAlSiN3 or in Ca2+SiO4 host containing materials may be added to the light scattering layer 160 to warm the light emitted by the light-diffusing optical fiber 140.

In some embodiments (not shown), a phosphor coating may be positioned on at least one of the support plate 110 or the cover plate 180 (see FIG. 8). Light emitted from the light source and scattered by the light-diffusing optical fiber 140 may interact with the phosphor coating of the support plate 110 or the cover plate 180, thereby modifying the color temperature of the light scattered by the light-diffusing optical fiber 140.

Referring now to FIG. 24, a plurality of light-diffusing optical fibers 140 may be collected into an optical fiber bundle 170, which is coupled to the support plate of the lighting unit. The optical fiber bundle 170 may allow for dispersion of a greater magnitude of light that is emitted by a light source than a single optical fiber. Accordingly, the light scattered by a lighting unit incorporating an optical fiber bundle 170 may be greater than the light scattered by a lighting unit incorporating a single optical fiber and a light source emitting light at a similar power.

Figure 25:
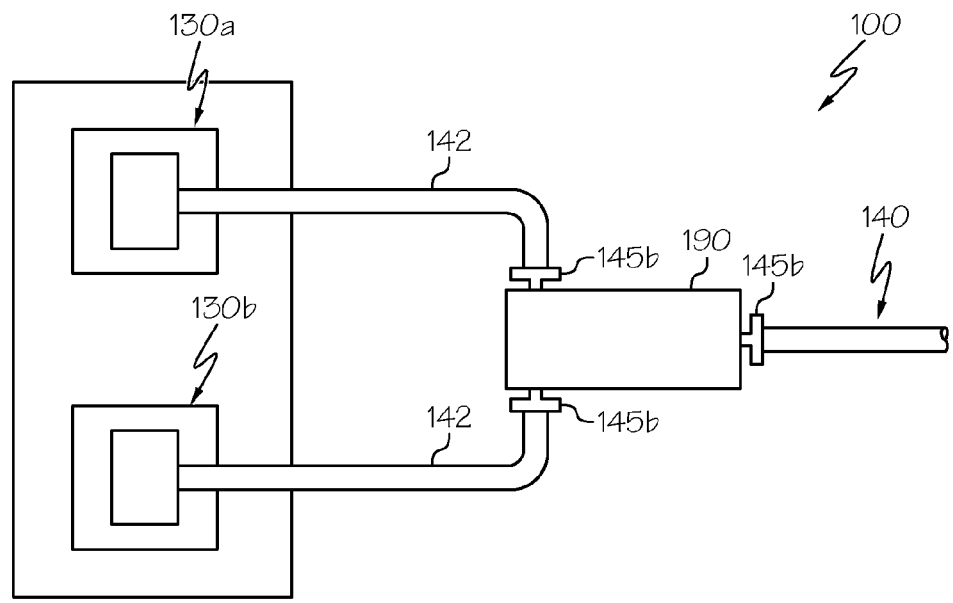
FIG. 25 schematically depicts a front view of a light source and a light-diffusing optical fiber according to one or more embodiments shown or described herein.
Figure 26:
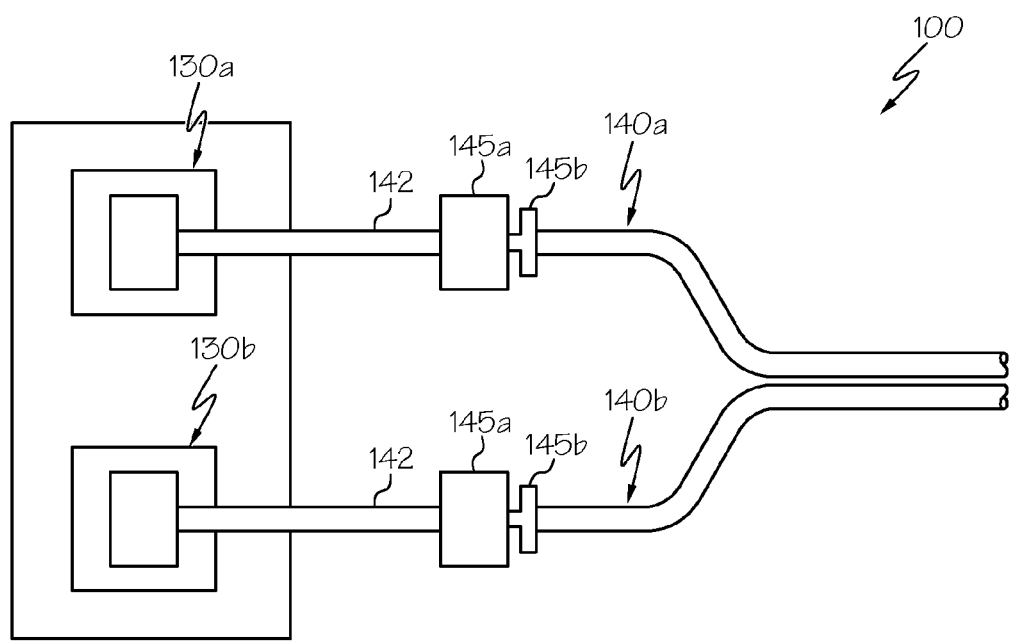
FIG. 26 schematically depicts a front view of a light source and light-diffusing optical fibers according to one or more embodiments shown or described herein.

Referring now to FIGS. 25 and 26, embodiments of lighting units 100 incorporating a plurality of light sources are depicted. The lighting unit includes a first light source component 130a and a second light source component 130b. In some embodiments, the first light source component 130a and the second light source component 130b may emit light in substantial portion at a different wavelength than the first light source component 130a. The light emitted by the first light source component 130a and the second light source component 130b may mix with one another to provide light into the surrounding environment having a color that is a combination of the light provided by the first light source component 130a and the second light source component 130b. The light provided by the combination of the first light source component 130a and the second light source component 130b may therefore emit light that fills a greater portion of the visible spectrum than light provided by a single light source. In one example, the first light source component 130a may be a blue laser that emits light in a range from about 360 nm to about 480 nm and the second light source component 130b may be a red laser that emits light in a range from about 633 nm to about 730 nm. In some embodiments, the intensity of the light emitted by the first light source component 130a and the second light source component 130b may be constrained to provide a desired intensity and color temperature of the light scattered from the combination of the first light source component 130a and the second light source component 130b. In some embodiments, the light-diffusing optical fiber may incorporate a phosphor (see FIG. 23) that interacts with light emitted by one of the light sources (i.e., a blue laser) and is passive to the light emitted by the other light source (i.e., the red laser). Accordingly, the light emitted by the phosphor and the first light source component 130a may be combined with light emitted by the second light source component 130b at a lower intensity than that emitted by the first light source component 130a to scatter light into the surrounding environment having a desired color temperature. The combination of light emitted by the blue laser and the red laser may provide a warmer color temperature than that provided by a single blue laser, which may be desirable for particular end-user applications. Further, the intensity of the first light source component 130a and the second light source component 130b may be modified relative to one another such that the intensity and color temperature of the light emitted by the combination of the first light source component 130a and the second light source component 130b are satisfactory for a particular end-user application.

Referring to FIG. 25, light from the first light source component 130a and the second light source component 130b may be directed into a fusion coupler 190 that combines the light emitted by the first light source component 130a and the second light source component 130b and directs the combination of light to at least one light-diffusing optical fiber 140. As discussed hereinabove, light transmitted through the fusion coupler 190 has a color temperature that is a combination of the light emitted by the first light source component 130a and the second light source component 130b. While the embodiment depicted in FIG. 25 illustrates that the fusion coupler 190 directing light from the first light source component 130a and the second light source component 130b into a single light-diffusing optical fiber 140, it should be understood that the fusion coupler 190 may distribute light to a plurality of light-diffusion optical fibers, including an optical fiber bundle 170 of light-diffusing optical fibers 140 (see FIG. 24).

Referring to FIG. 26, light from the first light source component 130a may be directed into a first light-diffusing optical fiber 140a and light from the second light source component 130b may be directed into a second light-diffusing optical fiber 140b. The first and second light-diffusing optical fibers 140a, 140b may be positioned proximate to one another along their lengths so that light scattered from the first light-diffusing optical fiber 140a interacts with light scattered from the second light-diffusing optical fiber 140b. In some embodiments, the first and the second light-diffusing optical fibers 140a, 140b may be coupled to one another along at least a portion of their lengths. Because of the close proximal placement of the first and second light-diffusing optical fibers 140a, 140b, the light scattered into the surrounding environment may be viewed as being scattered from a single location when viewed from a distance.

It should now be understood lighting units may include light diffusing fiber that is installed into decorative and/or structurally supportive light fixture. The lighting units include a light source optically coupled to at least one light-diffusing optical fiber. The at least one light-diffusing optical fiber is coupled to a support substrate, for example a support plate or a cover plate. Embodiments of the support substrate may include a retention groove to which a portion of the light-diffusing optical fiber is coupled. The groove is positioned along the support substrate and includes a groove length that is greater than the perimeter of the support substrate. The light source directs light into the light-diffusing optical fiber, which scatters the light in a lighting pattern. The retention groove may be formed in a variety of orientations into the support substrate such that the light-diffusing optical fiber scatters light into the surrounding environment in a desired pattern.

It is noted that the term "substantially" may be utilized herein to represent the inherent degree of uncertainty that may be attributed to any quantitative comparison, value, measurement, or other representation. This term is also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A lighting unit comprising:
 a light source;
 at least one light-diffusing optical fiber optically coupled to the light source, the at least one light-diffusing optical fiber scattering light optically coupled into the at least one light-diffusing optical fiber from the light source;
 a support plate having a retention groove to which a portion of the at least one light-diffusing optical fiber is coupled, the support plate further having a perimeter; and
 a cover plate positioned opposite at least one of a first surface or a second surface of the support plate, wherein the cover plate comprises regions of high opacity positioned proximate to regions of low opacity, and a groove length of the retention groove is greater than the perimeter of the support plate.

2. The lighting unit of claim 1, wherein the retention groove comprises an arcuate portion for receiving the at least one light-diffusing optical fiber, the arcuate portion being debossed into the first surface or the second surface opposite the first surface of the support plate.

3. The lighting unit of claim 2, wherein the support plate comprises a reflective portion, a filter, a coating portion, or a textured portion on at least one of the first surface or the second surface.

4. The lighting unit of claim 1, wherein the light source comprises a light emitting diode.

5. The lighting unit of claim 1, wherein the light source comprises a laser diode.

6. The lighting unit of claim 1, wherein the cover plate has a uniform opacity that is in a range which varies by less than or equal to about 10% of a median opacity.

7. The lighting unit of claim 1, wherein the cover plate comprises a plurality of collimating elements.

8. The lighting unit of claim 1, wherein the cover plate comprises a diverging lens.

9. The lighting unit of claim 1, wherein the cover plate comprises a concentrating lens.

10. The lighting unit of claim 1, further comprising at least one transmission optical fiber coupled to the light source and the at least one light-diffusing optical fiber.

11. The lighting unit of claim 1, wherein the light source comprises a first light source component introducing light at a first wavelength and a second light source component introducing light at a second wavelength different than the first.

12. The lighting unit of claim 1, wherein the at least one light-diffusing optical fiber comprises a phosphor light scattering layer.

13. The lighting unit of claim 1, wherein the at least one light-diffusing optical fiber comprises an optical fiber bundle of light-diffusing optical fibers.

14. A light fixture comprising the lighting unit of claim 1.

15. The light fixture of claim 14, wherein the light fixture is isolated from electric and optical sources in a surrounding environment.

16. A lighting unit according to claim 1:
 Wherein said support plate comprises a first surface, a second surface opposite the first surface, and said retention groove is debossed into at least the first surface, of the support plate, wherein a portion of said least one light-diffusing optical fiber is positioned in the retention groove such that the light scattered from the at least one light-diffusing optical fiber is optically coupled into the support plate, thereby illuminating the support plate.

17. The lighting unit of claim 16, wherein the support plate comprises a mirrored portion, a reflective portion, a filter, a coating portion, or a textured portion on at least one of the first surface or the second surface.

18. The lighting unit of claim 16, wherein the light source comprises a light emitting diode.

19. The lighting unit of claim 16, wherein the light source comprises a laser diode.

20. The lighting unit of claim 16, further comprising a cover plate positioned opposite at least one of the first surface or the second surface of the support plate.

21. The lighting unit of claim 20, wherein the cover plate has a uniform opacity that is in a range which varies by less than or equal to about 10% of a median opacity.

22. The lighting unit of claim 20, wherein the cover plate comprises regions of high opacity positioned proximate to regions of low opacity.

23. The lighting unit of claim 20, wherein the cover plate comprises a plurality of collimating elements.

24. The lighting unit of claim 20, wherein the cover plate comprises a diverging lens.

25. The lighting unit of claim 20, wherein the cover plate comprises a concentrating lens.

26. The lighting unit of claim 16, further comprising at least one transmission optical fiber coupled to the light source and the at least one light-diffusing optical fiber.

27. The lighting unit of claim 16, wherein the light source comprises a first light source component introducing light at a first wavelength and a second light source component introducing light at a second wavelength different than the first.

28. The lighting unit of claim 16, wherein the at least one light-diffusing optical fiber comprises a phosphor light scattering layer.

29. The lighting unit of claim 16, wherein the at least one light-diffusing optical fiber comprises an optical fiber bundle of light-diffusing optical fibers.

30. A lighting unit according to claim 1:
Wherein said support plate having a first surface and said perimeter circumscribes the first surface,
wherein the at least one light-diffusing optical fiber is positioned proximate to the first surface, and a length of the light-diffusing optical fiber positioned inside of the perimeter is greater than the perimeter, and the lighting unit is free from a cover plate positioned opposite the at least one light-diffusing optical fiber from the support plate.

31. The lighting unit of claim 30, wherein the support plate comprises a mirrored portion, reflective portion, a filter, a coating portion, or a textured portion on at least one of the first surface or a second surface opposite the first surface.

32. The lighting unit of claim 30, wherein the light source comprises a light emitting diode.

33. The lighting unit of claim 30, wherein the light source comprises a laser diode.

34. The lighting unit of claim 30, further comprising at least one transmission optical fiber coupled to the light source and the at least one light-diffusing optical fiber.

35. The lighting unit of claim 30, wherein the light source comprises a first light source component introducing light at a first wavelength and a second light source component introducing light at a second wavelength different than the first.

36. The lighting unit of claim 30, wherein the at least one light-diffusing optical fiber comprises a phosphor light scattering layer.

37. The lighting unit of claim 30, wherein the at least one light-diffusing optical fiber comprises an optical fiber bundle of light-diffusing optical fibers.

38. A lighting unit comprising:
a cover plate having at least one light shaping element and a perimeter;
at least one light-diffusing optical fiber coupled to the cover plate, the at least one light-diffusing optical fiber having a length greater than the perimeter of the cover plate; and
a light source optically coupled to the at least one light-diffusing optical fiber, the at least one light-diffusing optical fiber scattering light optically coupled into the at least one light-diffusing optical fiber from the light source,
wherein the at least one light shaping element comprises regions of high opacity positioned proximate to regions of low opacity.

39. The lighting unit of claim 38, further comprising a support plate coupled to the cover plate.

40. The lighting unit of claim 38, wherein the cover plate comprises a retention groove to which a portion of the at least one light-diffusing optical fiber is coupled.

41. The lighting unit of claim 38, wherein the at least one light-diffusing optical fiber is coupled to the cover plate by a bonding agent.

42. The lighting unit of claim 38, wherein the at least one light shaping element comprises a plurality of collimating elements.

43. The lighting unit of claim 38, wherein the at least one light shaping element comprises a diverging lens.

44. The lighting unit of claim 38, wherein the at least one light shaping element comprises a concentrating lens.

45. The lighting unit of claim 38, wherein the cover plate has a uniform opacity that is in a range which varies by less than or equal to about 10% of a median opacity.

46. A lighting unit comprising:
a light source;
at least one light-diffusing optical fiber optically coupled to the light source, the at least one light-diffusing optical fiber scattering light optically coupled into the at least one light-diffusing optical fiber from the light source;
a support plate having a plurality of retention bosses spaced apart from one another to which a portion of the at least one light-diffusing optical fiber is coupled, the support plate further having a perimeter,
wherein the plurality of retention bosses protrude from the support plate, and a length of the light-diffusing optical fiber positioned inside of the perimeter is greater than the perimeter of the support plate.

47. The lighting unit of claim 46, wherein the each of the retention bosses comprise an arcuate portion for receiving the at least one light-diffusing optical fiber.

48. The lighting unit of claim 46, further comprising a cover plate positioned opposite at least one of a first surface or a second surface opposite the first surface of the support plate.

49. The lighting unit of claim 46, wherein the support plate comprises a mirrored portion, reflective portion, a filter, a coating portion, or a textured portion on at least one of a first surface or a second surface opposite the first surface.

50. The lighting unit of claim 46, wherein the at least one light-diffusing optical fiber includes a light scattering layer.

51. The lighting unit of claim 50, wherein the light scattering layer includes a solid particle sized to scatter light.

52. The lighting unit of claim 50, wherein the light scattering layer includes a liquid droplet sized to scatter light.

53. The lighting unit of claim 50, wherein the light scattering layer includes a gas bubble sized to scatter light.

54. A lighting unit comprising:
a light source;
a support plate having a perimeter,
a cover plate coupled to the support plate; and an optical fiber assembly positioned between the support plate and the cover plate, at least a portion of the optical fiber assembly coupled to at least one of the support plate and the cover plate, wherein the optical fiber comprises at least one light-diffusing optical fiber positioned inside a jacket, the at least one light-diffusing optical fiber is optically coupled to the light source, and the at least one light-diffusing optical fiber scatters light that optically coupled into the at least one light-diffusing optical fiber from the light source into the jacket, and wherein the jacket comprises a phosphor material that modifies a color temperature of the light scattered by the light-diffusing optical fiber.

55. The lighting unit of claim 54, wherein the jacket is spaced a distance from the light-diffusing optical fiber to maintain a gap between the jacket and the light-diffusing optical fiber.

56. The lighting unit of claim 54, wherein the jacket is transparent.

57. The lighting unit of claim 54, wherein the jacket is translucent.

* * * * *